US011120029B2

United States Patent
DiBenedetto et al.

(10) Patent No.: US 11,120,029 B2
(45) Date of Patent: Sep. 14, 2021

(54) PREDICTING AND PRESENTING IMAGES CORRESPONDING TO FEATURES OR PRODUCTS

(71) Applicant: DREAM BOOK, LLC, Avon, OH (US)

(72) Inventors: Michael Sparky DiBenedetto, Avon, OH (US); Rand Thomas Lennox, Indianapolis, IN (US)

(73) Assignee: DREAM BOOK, LLC, Avon, OH (US)

( * ) Notice: Subject to any disclaimer, the term of this patent is extended or adjusted under 35 U.S.C. 154(b) by 0 days.

(21) Appl. No.: 16/886,588

(22) Filed: May 28, 2020

(65) Prior Publication Data

US 2020/0334262 A1    Oct. 22, 2020

Related U.S. Application Data

(63) Continuation-in-part of application No. 16/153,855, filed on Oct. 8, 2018, which is a continuation of application No. 15/953,679, filed on Apr. 16, 2018, now Pat. No. 10,095,754, application No. 16/886,588, which is a continuation-in-part of application No. 16/407,137, filed on May 8, 2019, which is a continuation-in-part of application No. 16/153,855, filed on Oct. 8, 2018, which is a continuation of application No. 15/953,679, filed on Apr. 16, 2018, now Pat. No. 10,095,754.

(60) Provisional application No. 62/584,579, filed on Nov. 10, 2017, provisional application No. 62/668,600, filed on May 8, 2018, provisional application No. 62/853,254, filed on May 28, 2019.

(51) Int. Cl.
| | | |
|---|---|---|
| G06F 16/2457 | (2019.01) | |
| G06F 16/58 | (2019.01) | |
| G06F 16/54 | (2019.01) | |
| G06F 16/583 | (2019.01) | |
| G06F 16/51 | (2019.01) | |

(52) U.S. Cl.
CPC ........ *G06F 16/24578* (2019.01); *G06F 16/51* (2019.01); *G06F 16/54* (2019.01); *G06F 16/5838* (2019.01); *G06F 16/5866* (2019.01)

(58) Field of Classification Search
CPC .......... G06F 16/24578; G06F 16/5838; G06F 16/51; G06F 16/5866; G06F 16/54
See application file for complete search history.

(56) References Cited

U.S. PATENT DOCUMENTS

| | | | |
|---|---|---|---|
| 6,016,487 A * | 1/2000 | Rioux | G06K 9/00201 |
| | | | 707/743 |
| 6,772,393 B1 | 8/2004 | Estrada et al. | |
| 6,928,454 B2 | 8/2005 | Menner et al. | |
| 7,661,958 B2 | 2/2010 | Meyer et al. | |
| 7,815,435 B2 | 10/2010 | Riley | |
| 7,966,567 B2 | 6/2011 | Abhyanker | |
| 8,434,250 B2 | 5/2013 | Epp | |
| 8,989,440 B2 | 3/2015 | Klusza et al. | |
| 9,110,999 B2 | 8/2015 | Shagrithaya et al. | |

(Continued)

*Primary Examiner* — Usmaan Saeed
*Assistant Examiner* — Jessica N Le
(74) *Attorney, Agent, or Firm* — Renner, Otto, Boisselle & Sklar, LLP

(57) ABSTRACT

Techniques are disclosed herein for predicting and presenting to a user images corresponding to visual depictions of materials for a room or building that are pleasant to the user.

18 Claims, 10 Drawing Sheets

(56) References Cited

U.S. PATENT DOCUMENTS

| | | | |
|---|---|---|---|
| 9,195,677 B2 | 11/2015 | Ball et al. | |
| 9,213,785 B2 | 12/2015 | Plewe | |
| 9,292,162 B2 | 3/2016 | Topakas et al. | |
| 9,396,493 B2 | 7/2016 | Bhardwaj et al. | |
| 9,465,512 B2 | 10/2016 | Topakas et al. | |
| 9,483,158 B2 | 11/2016 | Topakas et al. | |
| 9,582,163 B1 | 2/2017 | Banschick et al. | |
| 9,785,727 B1 | 10/2017 | Wilson | |
| 2005/0043614 A1* | 2/2005 | Huizenga | C23F 11/08 600/427 |
| 2016/0048573 A1* | 2/2016 | Muttik | H04W 4/70 707/737 |
| 2016/0292891 A1* | 10/2016 | O'Donnell | G06T 11/206 |
| 2018/0049498 A1* | 2/2018 | Koh | G05B 19/4097 |
| 2018/0137201 A1* | 5/2018 | Longbin | G06F 16/285 |
| 2018/0232661 A1* | 8/2018 | Li | G06F 17/16 |
| 2019/0102657 A1* | 4/2019 | SayyarRodsari | G06K 9/6272 |

* cited by examiner

PREDICTING AND PRESENTING IMAGES CORRESPONDING TO FEATURES OR PRODUCTS

CROSS-REFERENCE TO RELATED APPLICATIONS

The present application is a continuation in part of U.S. patent application Ser. No. 16/153,855, filed on Oct. 8, 2018, which is a continuation of U.S. patent application Ser. No. 15/953,679 (now U.S. Pat. No. 10,095,754) filed on Apr. 16, 2018, which claims benefit from U.S. Prov. Pat. App. No. 62/584,579, filed on Nov. 10, 2017, all of which are hereby incorporated by reference in their entirety. The present application is a continuation in part of U.S. patent application Ser. No. 16/407,137, filed on May 8, 2018, which is a continuation in part of U.S. patent application Ser. No. 16/153,855, filed on Oct. 8, 2018, which is a continuation of U.S. patent application Ser. No. 15/953,679 (now U.S. Pat. No. 10,095,754) filed on Apr. 16, 2018, which claims benefit from U.S. Prov. Pat. App. No. 62/584,579, filed on Nov. 10, 2017, all of which are hereby incorporated by reference in their entirety. The present application is a continuation in part of U.S. patent application Ser. No. 16/407,137, filed on May 8, 2018, which claims benefit from U.S. Prov. Pat. App. No. 62/668,600, filed on May 8, 2018, all of which are hereby incorporated by reference in their entirety. The present application claims benefit from U.S. Prov. Pat. App. No. 62/853,254, filed on May 28, 2019, which is hereby incorporated by reference in its entirety.

BACKGROUND

Home remodeling and renovation projects involve the remodeling of internal living spaces such as kitchens, bathrooms, and bedrooms as well as external spaces such as gardens, garages, and lawns. U.S. home improvement and repair expenditures have been estimated to exceed 300 billion dollars a year. Homeowners undertake home improvement projects to make their homes more comfortable and welcoming, and to increase the value of their homes. Some homeowners enlist professionals to design or decorate their living spaces. Most homeowners, however, have at least the desire to design or decorate their homes themselves. On the one hand, there has never been a better time for do-it-yourself home improvement. Manufacturers and retailers have made available to homeowners an ever-increasing variety of home improvement materials. Unfortunately, most homeowners do not possess the training or experience to adequately select materials from the ever-increasing variety of different styles and features.

Some tools exist to assist homeowners in the design or decoration of their home. Unfortunately, conventional tools for designing or decorating living spaces are unsophisticated. They, for example, do not address the problem of finding different décor items that match or harmonize to a particular style. Conventional tools lack the ability to select building materials and décor items with visually common features, such as color or style, which look pleasant together. The current tools further lack the ability to search the whole market for building materials and décor items based on décor style. The current tools also require a home buyer to examine what can be millions of combinations of fixtures, fittings, trims, paints, flooring materials, cabinets, etc. in order to select their preferred options for finishing out a home. This is a time-consuming process, usually taking 4-6 months during the home building process. Homeowners often find themselves overwhelmed over a home improvement project or disappointed of the results.

SUMMARY

The present disclosure describes novel techniques to assist homeowners in the design or decoration of their home, thereby improving results and the user experience. Homeowners, who do not possess the training or experience to adequately select by themselves from the ever-increasing variety of different styles, materials, and features, can now confidently build the living spaces of their dreams. The techniques described herein allow the homeowner or user to adequately select building materials and décor items by themselves because they can rely on other users' experiences, a form of crowdsourcing that promotes satisfactory results. The techniques disclosed herein may provide a starting point and, using an iterative process and customization options that take into account the particular user's own taste and budget, arrive at a complete room design.

The present disclosure describes novel techniques that improve upon home interior and exterior design products in at least 4 significant ways:

(1) Provide a method for learning and targeting user design preferences to speed the selection process;
(2) Reduce costs for a home buyer/owner by reducing the need to hire an interior design professional to achieve their style objectives;
(3) Reduce time to completion and holding time for the home builder/remodeler by drastically shortening the design cycle time for a home or room; and
(4) Reduce possible friction between the home builder/remodeler and home buyer/owner by providing detailed insight to the home builder/remodeler of the stylistic preferences of the buyer.

Although the techniques disclosed herein may be applicable to home design and decoration, the techniques disclosed herein represent technical improvements to computer technology. The technical improvements described herein are somewhat analogous to those embodied by the Google® search engine. That search engine may be helpful to users in searching the Internet to find anything from information about people and places to food recipes. That the Google® search engine is relevant to such non-technical human endeavors does not negate the fact that the engine represents (or at least at the time of its invention represented) a significant technical improvement in the computer technology field. Similarly, the techniques disclosed herein may have application in home design and decoration, but this should not negate the fact that the techniques represent a significant technical improvement in the computer technology field. The techniques disclosed herein improve the manner in which computer images (which happen to correspond to features or products) are presented to computer users so that such presentation of the images is more useful and more accurate to users. An improvement in the way computer images are presented to a user is indeed a technical improvement or benefit. And such improvement or benefit inures from the techniques disclosed and claimed herein.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
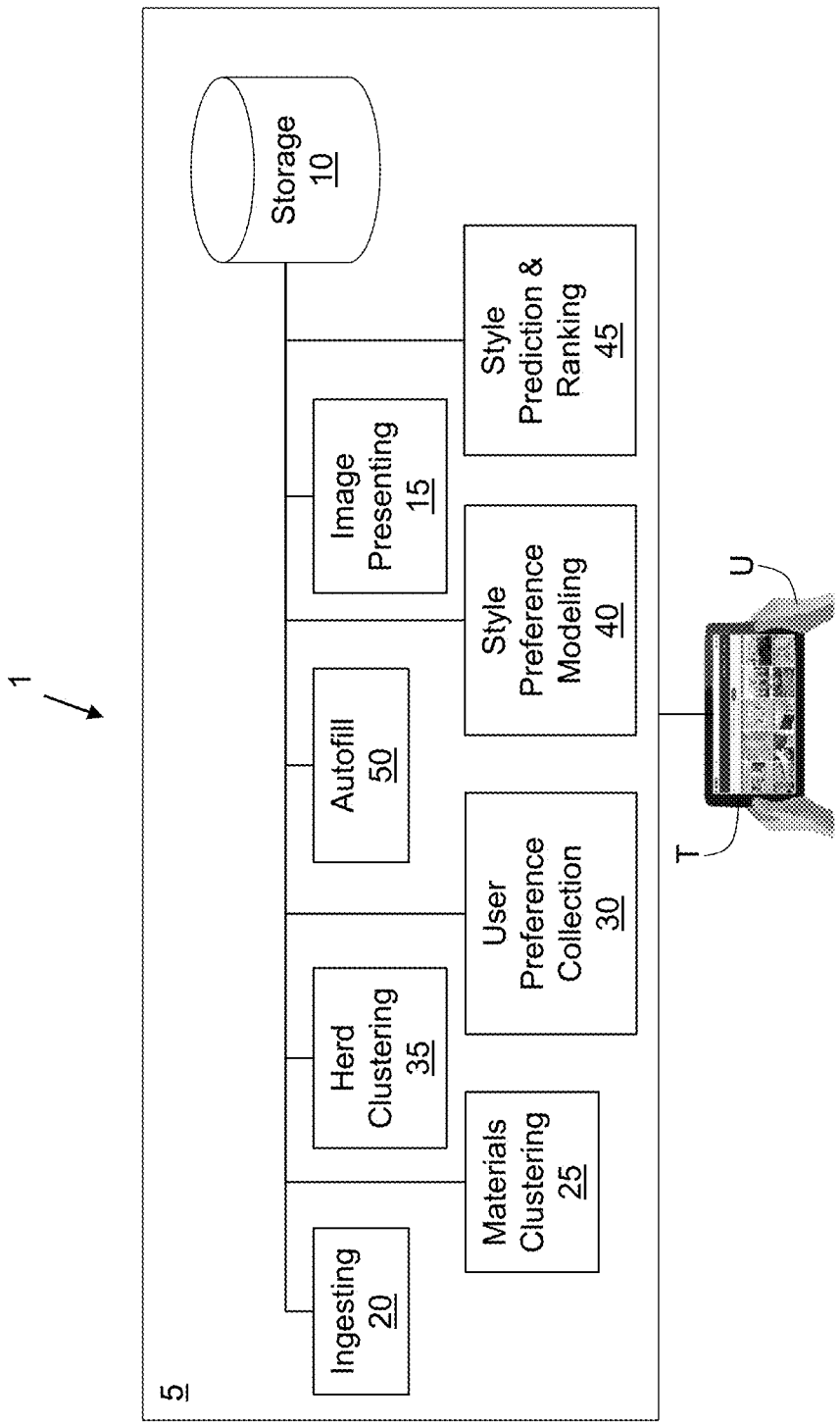
FIG. 1 illustrates a block diagram of an exemplary environment in which the technology disclosed herein may operate in various embodiments.

FIG. 1 illustrates a block diagram of an exemplary environment 1 in which the technology disclosed herein may operate in various embodiments. The environment 1 includes the system 5 with which a user U may interact via, for example, tablet T. The system 5 may include an image storage 10 in which images such as images of features or products (refer to herein as material images) may be stored and an image presenter 15 that displays the images on, for example, a display of the tablet T.

Figure 2:
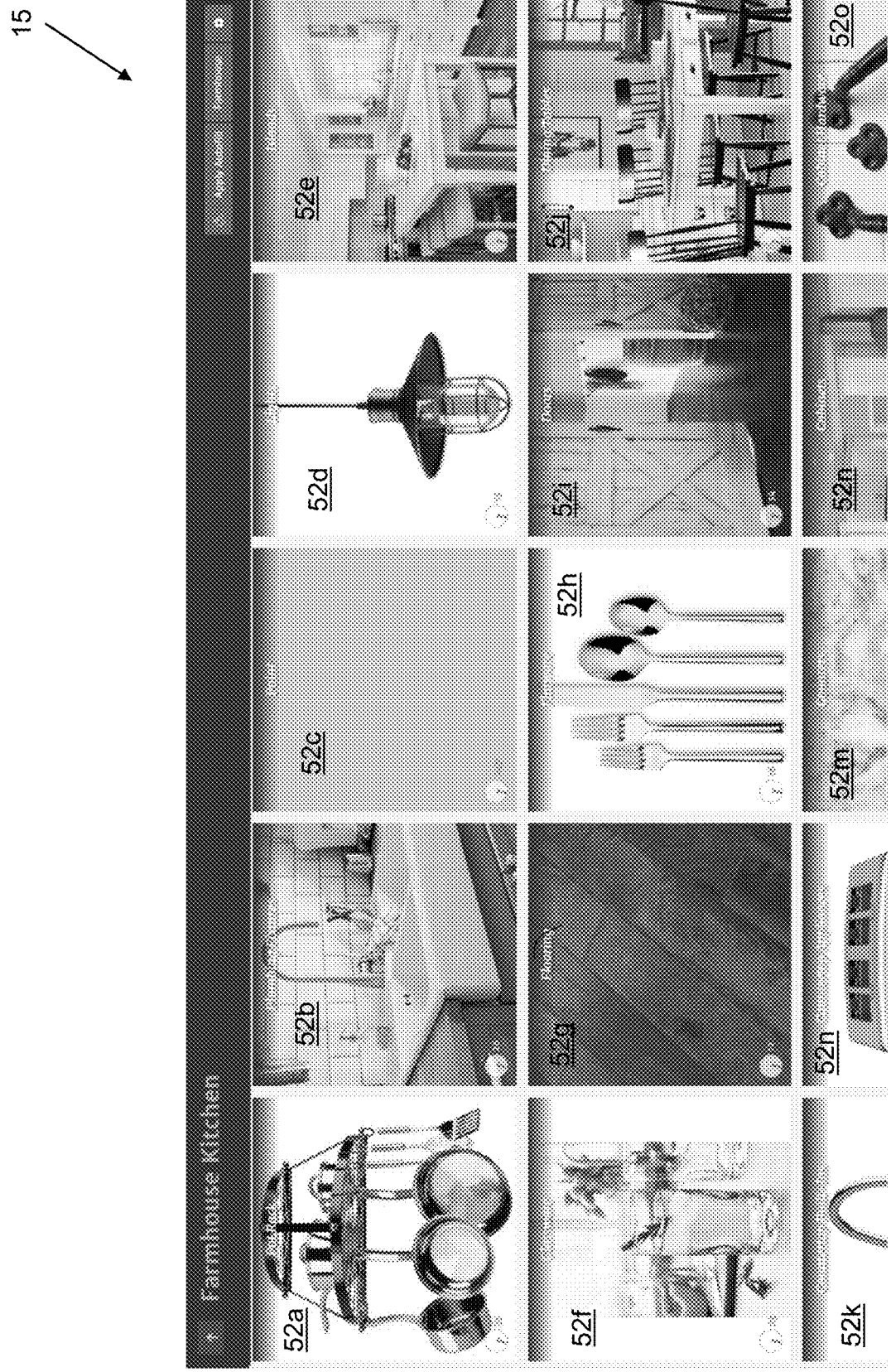
FIG. 2 illustrates an exemplary embodiment of an image presenter, a screenshot of a display of a tablet displaying material images.

FIG. 2 illustrates an exemplary embodiment of the image presenter 15, a screenshot of the display of the tablet T displaying material images 52. The material images 52 are visual depictions of features or products recommended by the system 5 to the user U for a particular room. In the example of FIG. 2, the room is a kitchen and it includes images corresponding to a pot rack 52a, a plumbing fixture or faucet 52b, wall paint 52c, lighting fixture 52d, an island 52e, glassware 52f, flooring 52f, flatware 52h, doors 52i, dining tables 52j, countertop build-ins 52k, countertop appliances 52l, countertops 52m, cabinets 52n, and cabinet hardware 52o. The system 5 presents the recommendation images 52 to the user U selected/predicted based on machine learning taking into account actual tastes of the user U and tastes of other users with similar tastes.

Returning to FIG. 1, the system 5 may learn the interior or exterior design preferences of the user U and predicts fixtures, fittings, trims, paints, and other finishing materials that will meet the personal design preferences of the user U, enabling semi- and fully-automated completion of the material selection process. The system 5 may include the image presenter 15, an ingestion engine 20, a materials clustering engine 25, a user preference collection engine 30, a herd clustering engine 35, a style preference modeling engine 40, a style prediction and ranking engine 45, and an autocompletion engine 50 as described in detail below.

Figure 3A:
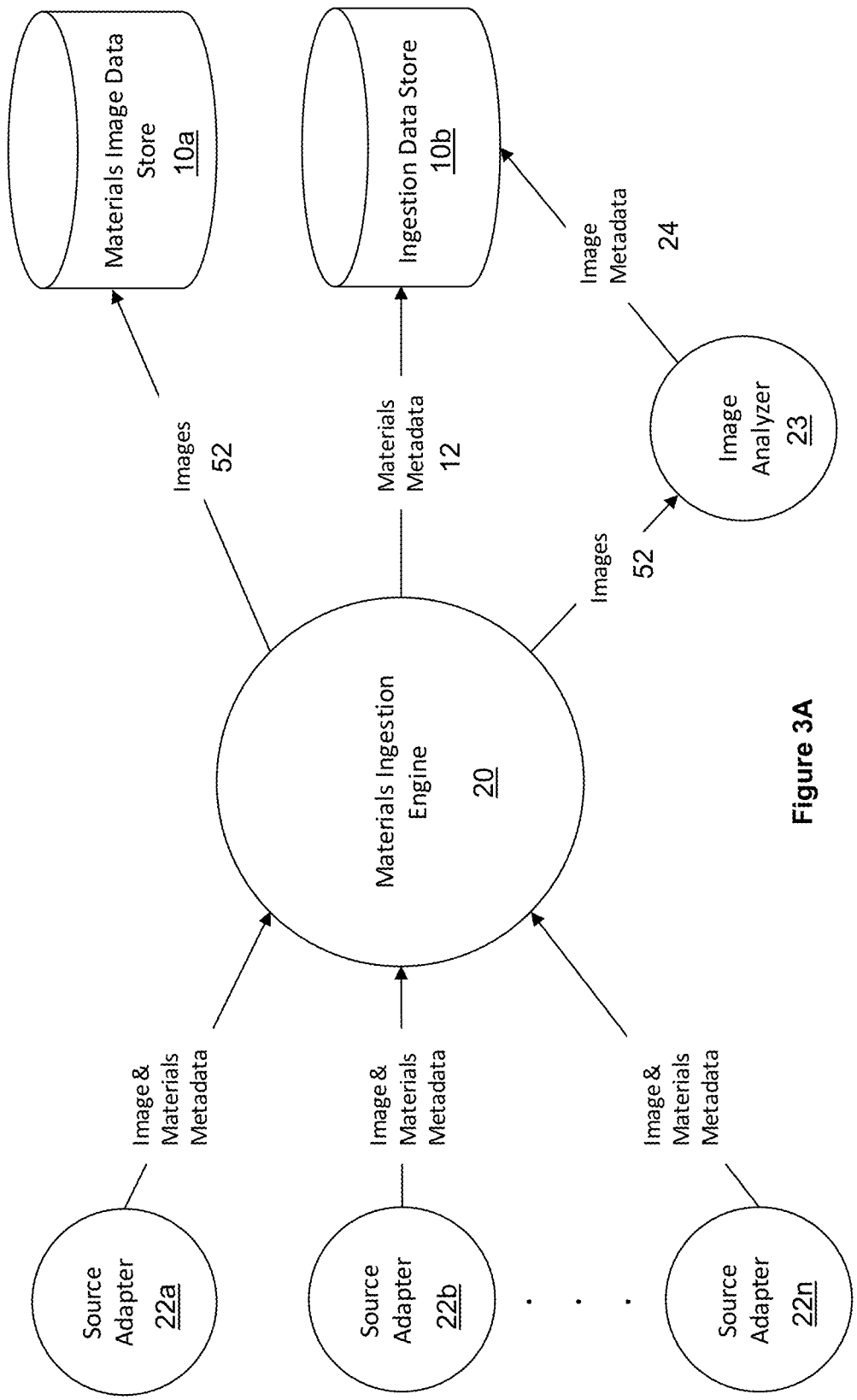
FIG. 3A illustrates an exemplary schematic diagram including an ingestion engine.

FIG. 3A illustrates an exemplary schematic diagram including the ingestion engine 20. The ingestion engine 20 is operably connected to source adapters 22a-n, which correspond to input devices from which the material images 52 are received. Such source adapters 22 may correspond to simple upload features of a web browser, file transfer protocol interfaces, an application programming interface, etc. from which a party (e.g., manufacturer, distributor, etc.) of a product or feature may provide the material image 52 to the ingestion engine 20. Together with the image the ingestion engine 20 may receive metadata corresponding to the respective material image. This materials metadata may include data identifying the features or products appearing in the images 52 as belonging to classes and subclasses according to a taxonomy model (e.g., Class: Faucet=>SubClass: Kitchen Faucet, Class: Faucet=>SubClass: Bathroom Faucet, Class: Paint=>SubClass: Interior Paint=>SubSubClass: Interior Wall Paint, etc.) The material metadata may also include the material's manufacturer supplied metadata (e.g., Kitchen Faucet, 3-hole, stainless steel, 32" L, 22" W, 9" D, etc.)

The ingestion engine 20 may receive the images 52 and store them in the image storage 10a. The system 5 may also include the metadata storage 10b for the ingestion engine 20 to extract materials metadata of the images 52 received from the source adapters 22 and store the materials metadata in the metadata storage 10b. And another type of metadata may also be stored in the metadata storage 10b. The ingestion engine 20 may include an image analyzer 23 that analyzes the images 52 received from the source adapters 22 to determine image metadata 24. The image metadata or image analysis data 24 may include color family, compositional tone, temperature, texture, luminosity, hue, or tint. The image analyzer 23 analyzes the received images to produce image analysis data or image metadata 24, which is then stored in the metadata storage 10b. The combination of the materials metadata 12 and the image analysis metadata 24 may be referred to as ingestion data.

Figure 3B:
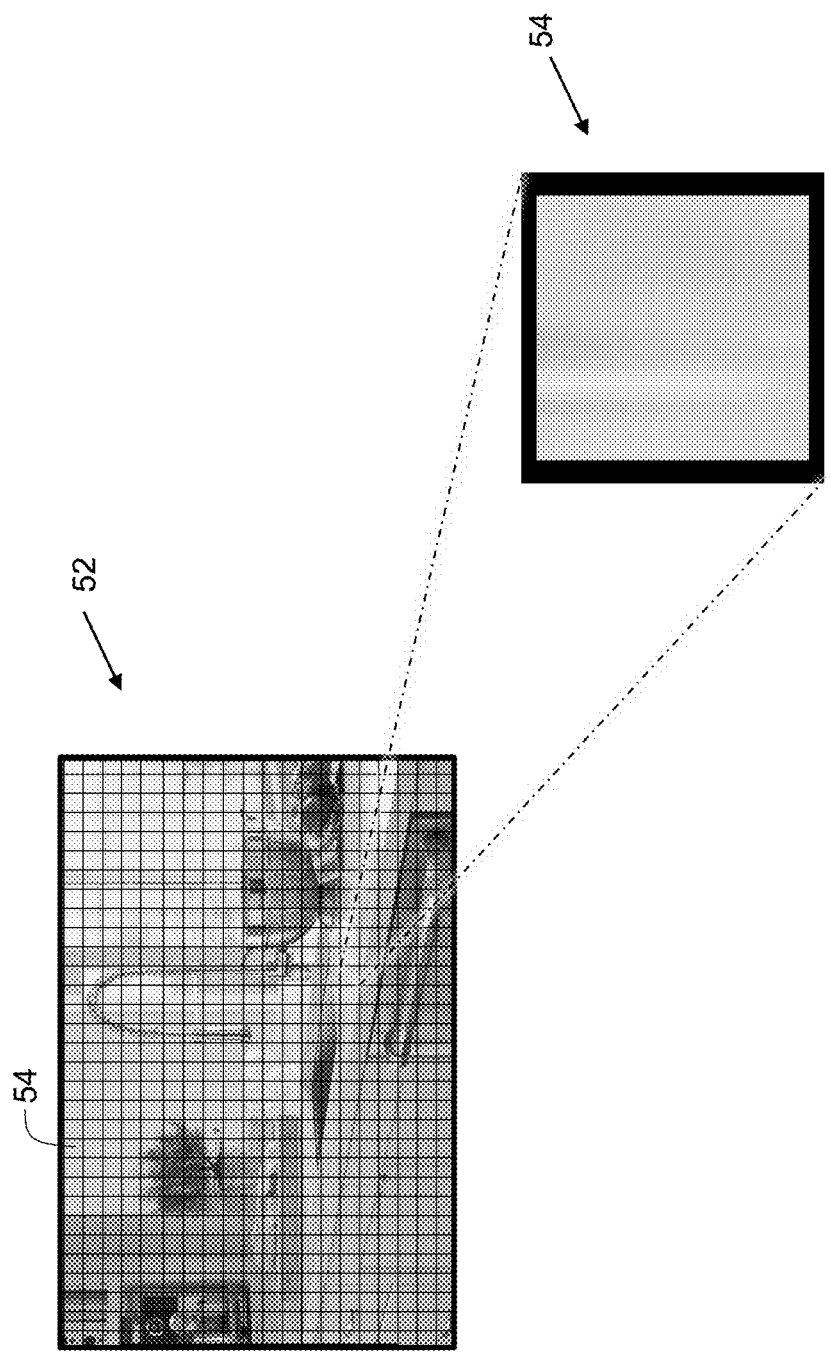
FIG. 3B illustrates a schematic diagram of an exemplary process for the ingestion engine of FIG. 3A to analyze ingestion images.

FIG. 3B illustrates a schematic diagram of an exemplary process for the ingestion engine 20 to analyze the ingestion images 52. The ingestion engine 20 may receive and divide the image 52 into m-by-n blocks 54. Each block 54 corresponds to a small portion of the image 52, less than the overall area of the image 52. In one embodiment, block 54 is in the range of 0.05 to 0.1% of the image 52. But the appropriate size for the block 54 may depend on the size of the image 52. Therefore, sizes of the block 54 smaller than 0.05% or larger than 0.1% of the image 52 may be possible. Moreover, depending on the aspect ratio of the image 52, the values of m and n may also vary. In one embodiment, the ingestion engine 20 may divide the image 52 into n-by-n blocks 54.

The ingestion engine 20 may then analyze each block 54 to determine a predominant color, frequency of color variations, frequency of light to dark transitions, or depth of light to dark transitions (e.g., black-to-white=1.0, light gray to dark gray=0.05) of the block 54. In one embodiment, the ingestion engine 20 may apply thinning to the blocks 54 to reduce noise generated by very slight changes in block features by applying a Gaussian blur to each block 54. The ingestion engine 20 may then analyze each blurred block 54 to determine the predominant color, frequency of color variations, frequency of light to dark transitions, or depth of light to dark transitions of the blurred block 54. Either data set (i.e., blurred or not blurred) may be used on its own or in combination with the other to produce image analysis data 24.

Upon completion of analysis of each block 54, the blocks 54 may be reassembled into a weighting matrix comprised of all the blocks 54 organized by weighted nearest-neighbor. Since the images 52 will, generally, be professionally produced (e.g., product catalog images) and, thus, the main features will, generally, be at the centers of the images 52, a center-weighting matrix may also be applied to the overall matrix to increase the values of blocks at the centers of the images 52 relative to values of blocks at edges of the images 52.

The ingestion engine 20 may then make the following calculations from the weighted matrix:

Color family will be calculated by the weighted average predominant color of the blocks and indexing the result against the Pantone® color families.

Hue/Tint will be calculated by converting the RGB image to the HSL, HSV, HSI, or HSB color space and using the Hue component.

Luminosity will be calculated by converting the RGB image to the HSL color space and using the Luminosity component.

Texture will be computed by using the weighted average of light/dark transitions in the blocks. A lower number of transitions indicates a smoother texture, a higher number indicates a coarser texture.

Temperature will be computed by indexing the weighted average predominant color to a linear spread of colors generated on a heat map scale, ranging from white (very hot) to black (very cold) and arranged by RGB where red is warmer and blue is cooler.

Compositional tone will be computed by combining the weighted average of the texture calculation, the weighted average of the frequency of color transitions, and the weighted average of the temperature calculation. A high level of color transitions, and/or coarseness, and/or temperature has a high compositional tone (e.g. it is visually "busy/exciting"), lower levels have a lower compositional tone (e.g. it is visually "clean/calming").

The ingestion engine 20 may then store the results of these calculations, the image analysis data or image metadata 24, in the materials metadata storage 10b.

Figure 4:
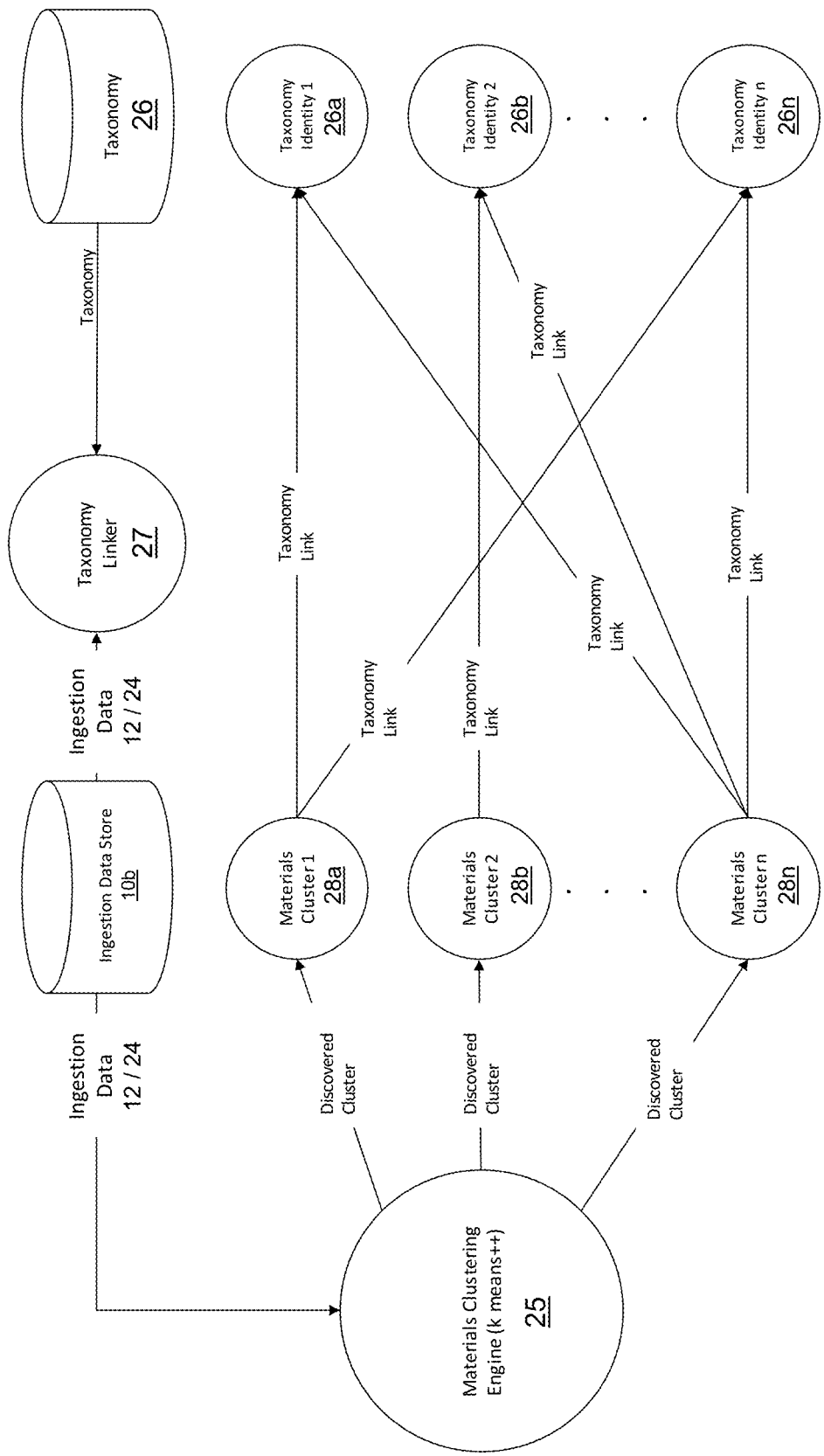
FIG. 4 illustrates a schematic diagram including a materials clustering engine.

FIG. 4 illustrates a schematic diagram including the materials clustering engine 25. The materials clustering engine 25 analyzes the ingestion data produced by the ingestion engine 20 to determine clusters of like materials on multiple axes. The materials clustering engine 25 may classify the ingestion data (the combination of the materials metadata 12 and the image analysis metadata 24) stored in the storage 10b into classes according to the taxonomy model 26 to produce classified ingestion data. The materials clustering engine 25 may examine the ingestion data produced and perform k-means++ clustering on the visually extracted data to assign groupings to each material. Separate clusters are produced for each kind of material according to the known taxonomy. For example, the materials clustering engine 25 may include a taxonomy linker 27 that links the taxonomy identities 26a-26n to the ingestion data such that, upon clustering, each material cluster 28a-28n is linked to a taxonomy identity 26a-26n. The development of independent clusters supports using the herd clustering engine 30 in the next stage while simultaneously supporting choices that make sense for autofill 50 (e.g., do not use a bathroom faucet when autofilling a kitchen faucet).

The procedure for the k-means++ clustering of the input data may look as follows:

```
For each TaxonomyItem i in Taxonomy
    // Initialize the cluster
    Label: ClusteringImplementation
    Set Means = [ ];
    Set RemainingItems = [ ] of TaxonomyItems[i]
    Set NextItem = (Choose one data item at random from Remaining
    Items)
    Set Means[0] = NextItem
    Remove NextItem from RemainingItems
    While RemainingItems is not empty
        Set MaxDistanceItem = null
        For each Mean in Means[ ]
            Compute EuclidianDistance of NextItem to Mean
            If (EuclidianDistance >
            MaxDistanceItem.EuclidianDistance)
                Set MaxDistanceItem = Mean
            End if
        End For
        Add MaxDistanceItem to Means[ ]
        Remove MaxDistanceItem from RemainingItems
        Set NextItem = MaxDistanceItem
    End while
    // Calculate the Iterative Clustering
    Set Iterations = 0;
    Set MeansClusters = Means[ ];
    While (Iterations < MaxIterations)
        Apply Clustering (from Label: ClusteringImplementation above)
        If No clusters changed (no means indexes changed) exit while
    End While
    Set Taxonomy[Cluster] = MeansClusters
End
```

A categorization method is not needed for this engine since categorization is externally provided from the material manufacturer metadata and the applied taxonomy.

Figure 5:
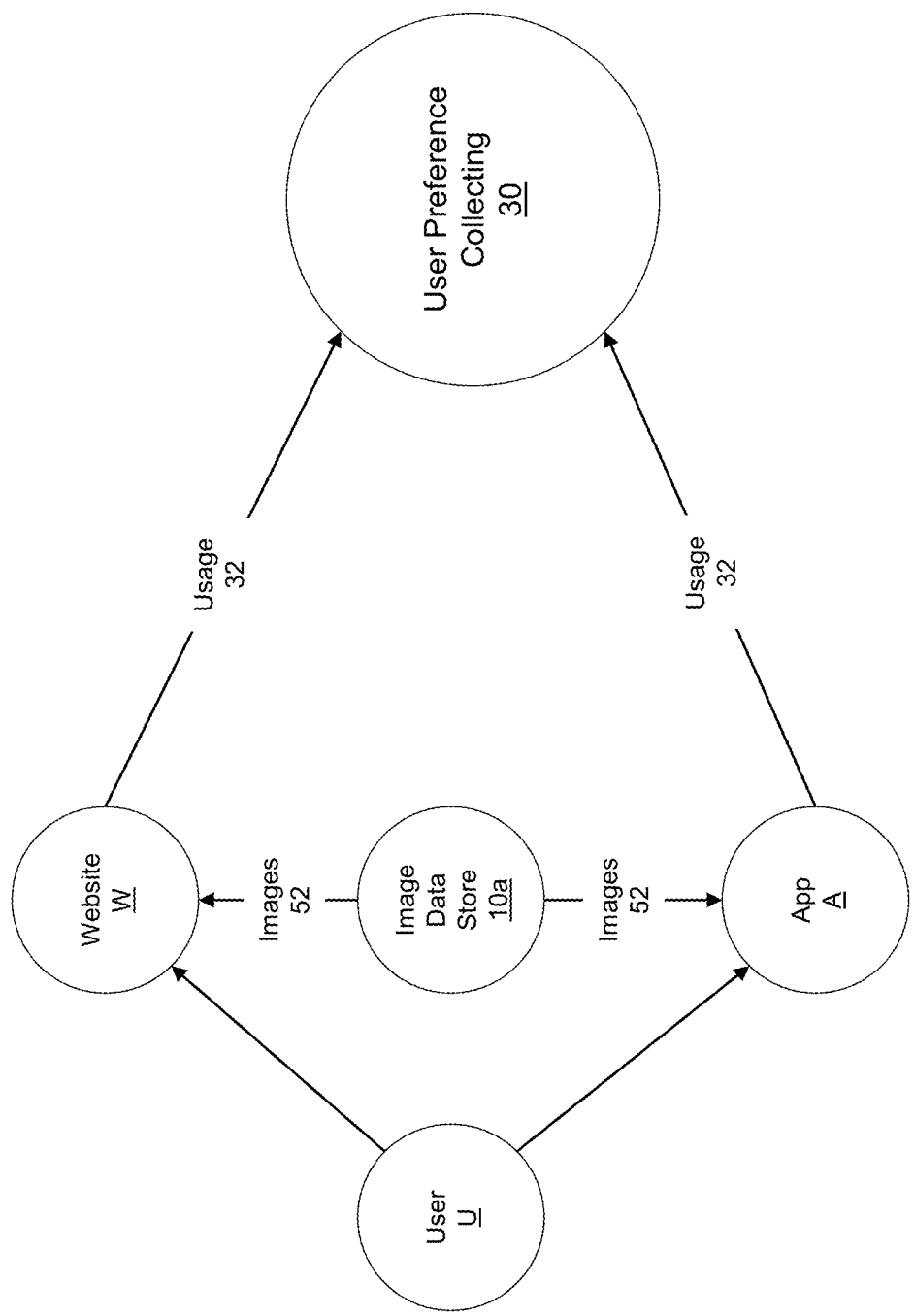
FIG. 5 illustrates a schematic diagram including a user preference collection engine.

FIG. 5 illustrates a schematic diagram including the user preference collection engine 30. The user preference collection engine 30 utilizes "click-tracking" to gain additional insight into the unique stylistic preferences of users by tracking the products or features they search for, examine, or positively identify as pleasing to them. This information may be used later on by the style preference modeling engine 40 to adjust clustered herd membership strength in order to better match an individual's personal style rather than merely matching to herd's preferences. While the style preference modeling engine 40 can predict merely by prediction from herd preferences (thereby allowing prediction for a first-time user), over time the user preference collection engine 30 allows the personal model to adapt to slight variations of herd members. Additionally, the user preference collection engine 30 enables maintaining personal style preferences when an individual's style preferences do not change while a herd's preferences may drift over time.

The user preference collection engine 30 may be implemented as a straightforward integration into an existing application or web site. The user preference collection engine 30 captures usage information 32 corresponding to the users' usage of the web site W or application A and users' interaction with the ingestion images 52. The user preference collection engine 30 correlates the usage information 32 to respective images from the ingestion images 52. The usage information corresponds to:

1) User performed searches and the search criteria,

2) User examination of search results and depth of examination (e.g. how many interactions and repeat interactions were performed by the user on an individual search result), and 3) User positive identification of a stylistic preference and the type of positive identification (e.g. "purchase", "like", "wish list", etc.).

In this engine, this data is not analyzed in any manner. Instead, it is captured and stored for use by other parts of the overall system 5.

Figure 6:
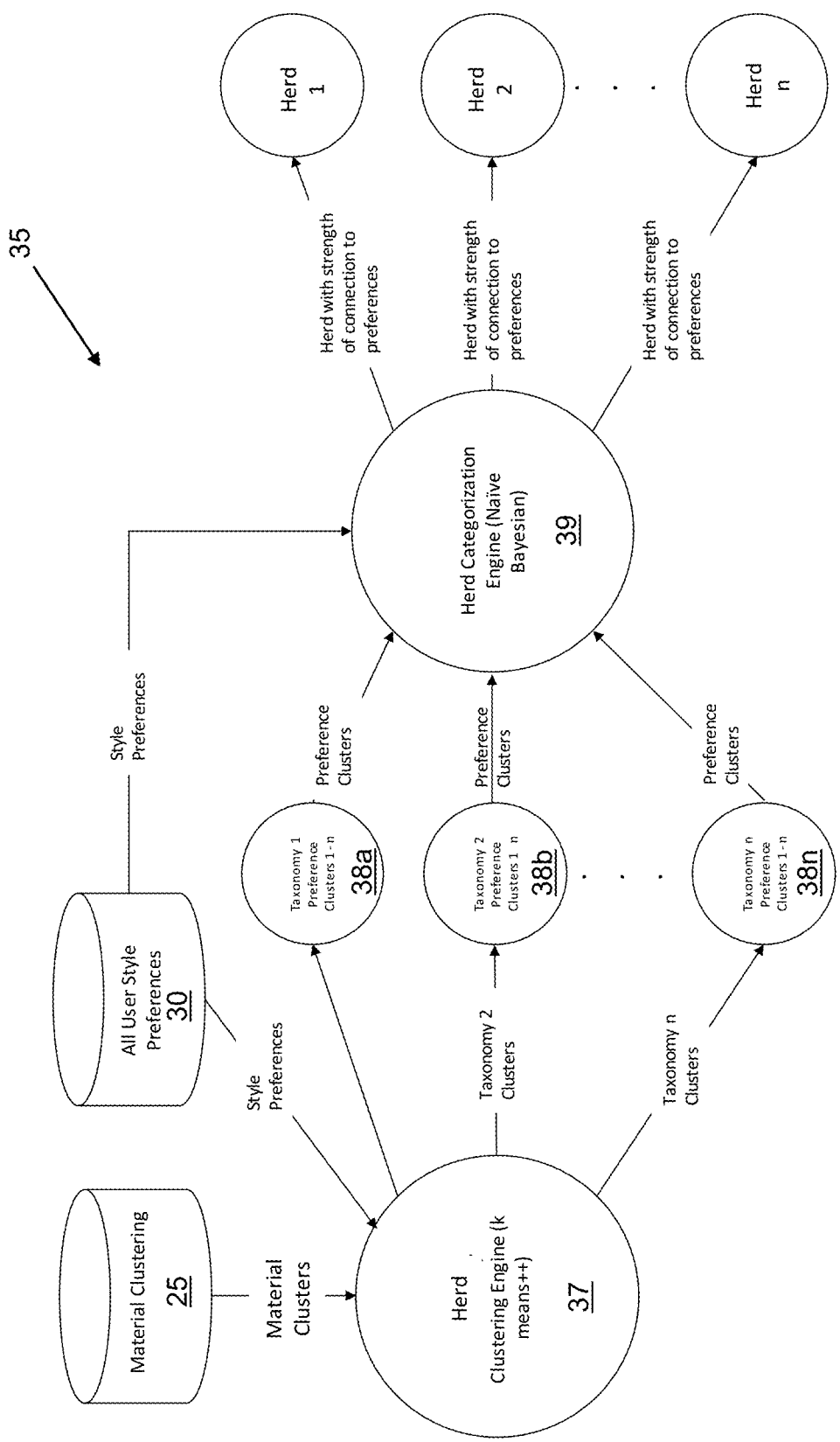
FIG. 6 illustrates a schematic diagram of an exemplary herd clustering engine.

FIG. 6 illustrates a schematic diagram of an exemplary herd clustering engine 35. The herd clustering engine 35 combines the output of the materials clustering engine 25 in combination with known personal preferences to produce "herds." A "herd" is a cluster of individual users with like-minded style preferences. A person may be a member of several herd clusters, just as a person can simultaneously be right-handed, enjoy classical music, and dislike pizza. Herd membership is therefore described by a strength of attachment to a specific herd cluster, not merely by binary member/non-member criteria.

The herd clustering engine 35 consists of two stages: clustering 37 and herd categorization 39.

In the clustering stage 37, the herd clustering engine 35 may cluster the materials clusters based on the usage information to produce herd clusters on multiple axes for each of the users. The output of the user preference collection engine 30 may be combined with the output of the materials clustering engine 25 to develop clusters of materials preferred by users in a herd. In other words, this stage will develop clusters of individuals that like similar kinds of kitchen faucets, bathroom faucets, wall paint colors, flooring choices, etc. in combination.

Like the materials clustering engine 25, this stage will use k-means++ clustering to develop clusters of like-minded choices of differing materials used for different purposes. In the clustering stage, only these clusters are developed. The herd clustering stage uses the same clustering algorithm described for the materials clustering engine 25; however, the outer loop control is for each user rather than for each taxonomy, resulting in user clusters rather than taxonomy clusters.

In the herd categorization stage, the herd clustering engine 35 may categorize the herd clusters to identify herds of users and calculate a strength of attachment of each herd to each herd cluster. In the categorization stage, output from the "discovered" clusters may be categorized using naive Bayesian classification to identify herds and the strength of attachment of a herd to each herd cluster. A strength of attachment may be calculated for all clusters identified in the clustering stage, with −1.0 indicating very strong dislike and 1.0 indicating a very strong preference. The training data for the algorithm is derived from the known personal preferences from the user preference collection engine 30.

Figure 7:
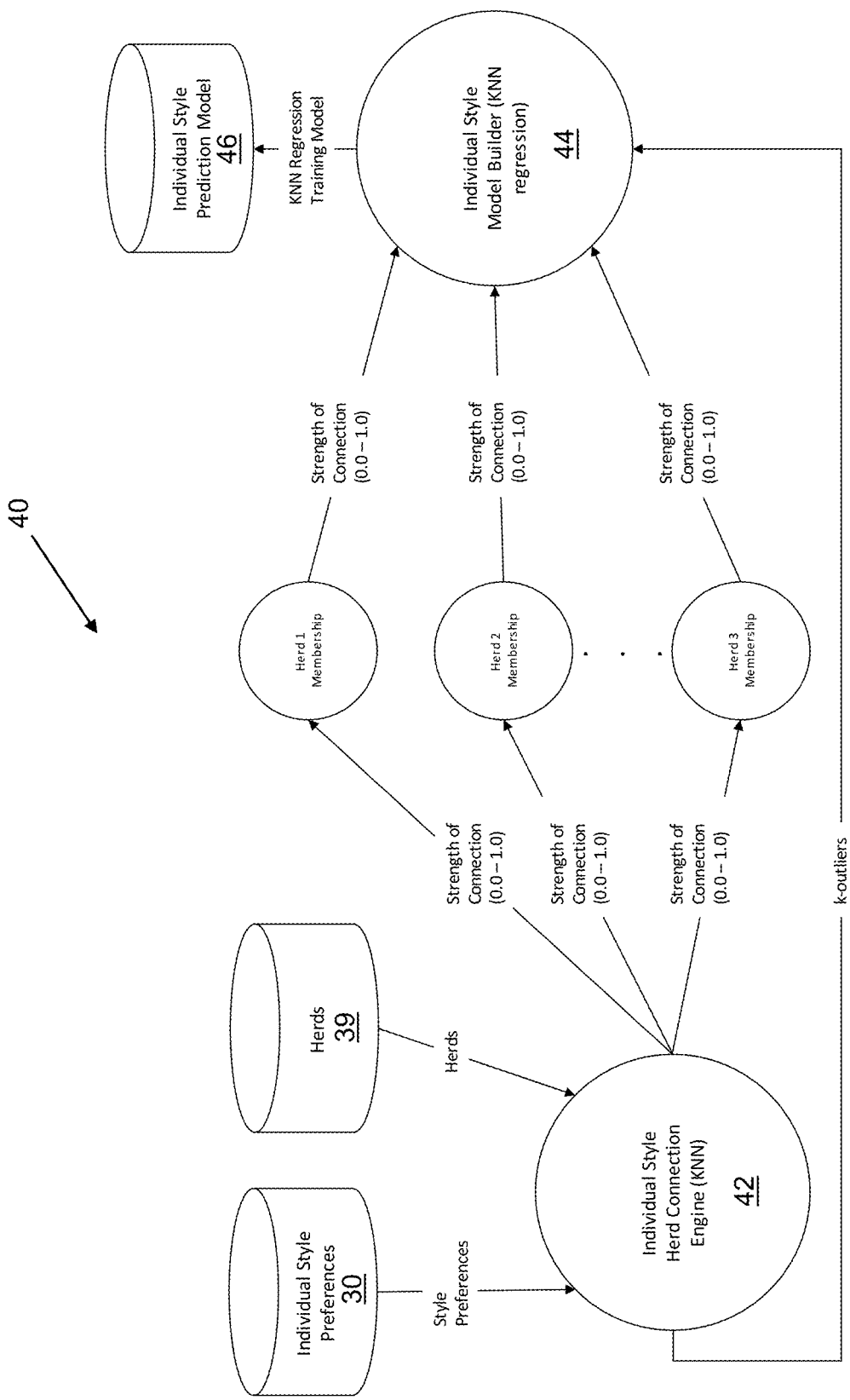
FIG. 7 illustrates a schematic diagram of an exemplary style preference modeling engine.

FIG. 7 illustrates a schematic diagram of an exemplary style preference modeling engine 40. The style preference modeling engine 40 includes two stages: an individual style herd connection engine 42 and an individual style model builder 44. The individual style herd connection engine 42 combines herd clusters, a user's cluster membership information, and self-selected user's preferences to produce a training model 46 for predictions of the personal preferences style preferences for a user.

The style preference modeling process is similar to the herd categorization process. However, while the herd categorization process computes the strength of the connection of the herd to groups of materials, the style preference process computes the strength of connection of an individual user to various herds. In this manner, and individual user's variation in taste from their identified herds is taken into account rather than only predicting the style preferences of the herd. This process is an iterative process that may consist of the following steps:

---

Initialize the User-Specific Training Model from the Member Herd Models
For each UserSelection In UserSelections (gathered during Buyer Collection)
    If (UserSelection is not stale)
        Test the UserSelection against the Training Model
        If (knn-outlier) increase user training model strength by 1.0
        Else If (strong correlation) increase user training model strength
        Else (weak correlation) reduce user training model strength
    End if
End for

---

The individual style model builder 44 produces a training model 46 for predictions of the personal preferences of a user by calculating a strength of attachment of the user to each of the herds. A few notes:

1) Initialization of the User-Specific training model will be performed using the K-NN (k nearest neighbor) training algorithm on the herd models weighted by the user's herd membership.
2) The test for predictive strength in the loop above will use the K-NN regression algorithm to determine the correlation of the user's selections to those of the herd.
3) The use of knn-outliers may be critical in this algorithm since outliers from the herd indicate a strong user preference to vary from the herd in a significant way.
4) The use of stale data rejection may be critical in this algorithm since very old selections are less significant than recent ones. This supports changing tastes to be reflected over time.

The style prediction and ranking engine 45 utilizes the training model 46 developed by the style preference modeling engine 40 to predict which materials are most likely to be perceived as pleasing to an individual user. This information can be used to either suggest choices to a user or to "auto complete" choices for the user for their later review and acceptance using the autofill 50.

With the availability of the user-specific K-NN training model, it is possible to very quickly analyze search results of materials against the model to determine strength of "fit" for a particular material to a user's specific preferences and to rank them accordingly. Additionally, in the event of a "tie", the preferences of the herd can be used as a tie-breaking mechanism.

To support real-time ranking and calculation against millions of potential products, the style prediction and ranking algorithm may pre-calculate user- and herd-specific rankings according to the taxonomy used by the materials clustering engine. While the initial seeding of this data is time-consuming, there is very little net change in the product catalog over time, and therefore the time for the net-change calculations for users is negligible.

Ranking may be performed using k-nn regression based on the training data produced for the user by the style preference modeling engine.

The autocompletion engine 50 utilizes the output of the style preference modeling engine 40 to make automated choices of various finish components (e.g. faucets, lighting fixtures, wall covering materials and colors, flooring materials, cabinets, etc.) based on the individual style prediction model 46 created for that user. Autocompletion 50 may be performed using the following steps:

```
For each ItemToBeSelected
    Set SelectedItem = null
    Set RejectedItems = [ ]
    While (SelectedItem is null)
        Set PossibleSelection = Max ranked Non-RejectedItem item
        based on user style
        If (NextItem meets SelectionConstraints) Set SelectedItem =
        PossibleSelection
        Else Add PossibleSelection to RejectedItems
    End While
    Set AutoCompletionValue = SelectedItem
End For
```

The autocompletion algorithm may apply constraints to the selections. These constraints may be computed from the metadata of the materials catalog as well as by taxonomy matching. For example, a bathroom faucet cannot be used as a kitchen faucet (taxonomy constrained), a 36-inch sink cannot be used in a space that can only accept a 32-inch sink (metadata constrained), etc. The procedure identifies the item most pleasing to the user (based on the ranking from the user's individual training model) that can be used for the specific purpose (taxonomy) in an engineered space (metadata). Furthermore, since the user's style preferences are derived from herd preferences, items can be autocompleted that the user may never have personally previously examined nor explicitly established as an individual preference.

The design preference and autocompletion process consists of three components: 1) Seeding/Initial Model Generation Process, 2) Continuous Model Refinement Process, and 3) User Style Seeding Process.

The seeding/initial model generation process involves two steps: 1) Creating all the initial clusters and models by ingesting materials catalog information (images and text provided by material manufacturers and distributors) through the materials ingestion engine and materials clustering engine to produce the initial materials clusters. 2) Creating an initial set of herd clusters and style prediction models by ingesting materials of well-known, curated designers with a wide variety of design preferences. In effect, the preferences of this population will perform the role (virtually) of "users" to create the initial herd and style models.

Upon establishment of the initial models, the system will perform continuous refinement of the models supplied by each engine as additional data is gathered through the ingestion engine (e.g. products added or removed from the materials catalog) or through the usage information of actual materials gathered by the buyer preference collection engine. This continuous model refinement will support changes in predicted preferences as styles and materials change over time. Note that there is no additional engine development required for this process, it merely requires that the engines run continuously to adjust the models as new inputs are received.

In order to develop an initial user preference training model, the user may be given the opportunity to select from a series of images and indicate which ones they "like best". These images will be presented from herd preferences according to the taxonomy established for the ingestion engine. User selections are fed to the buyer preference collection engine to begin the process of establishing a user-specific model for the buyer. Note that this is an optional step since any user interaction with the buyer will be captured by the user preference collection engine 30; however offering this ability will allow a user to provide valuable "confirmed, positive" preference information very early in the process, thereby leading to better predictive outcomes at the very early stages of user engagement.

Example methods may be better appreciated with reference to flow diagrams.

Figure 8:
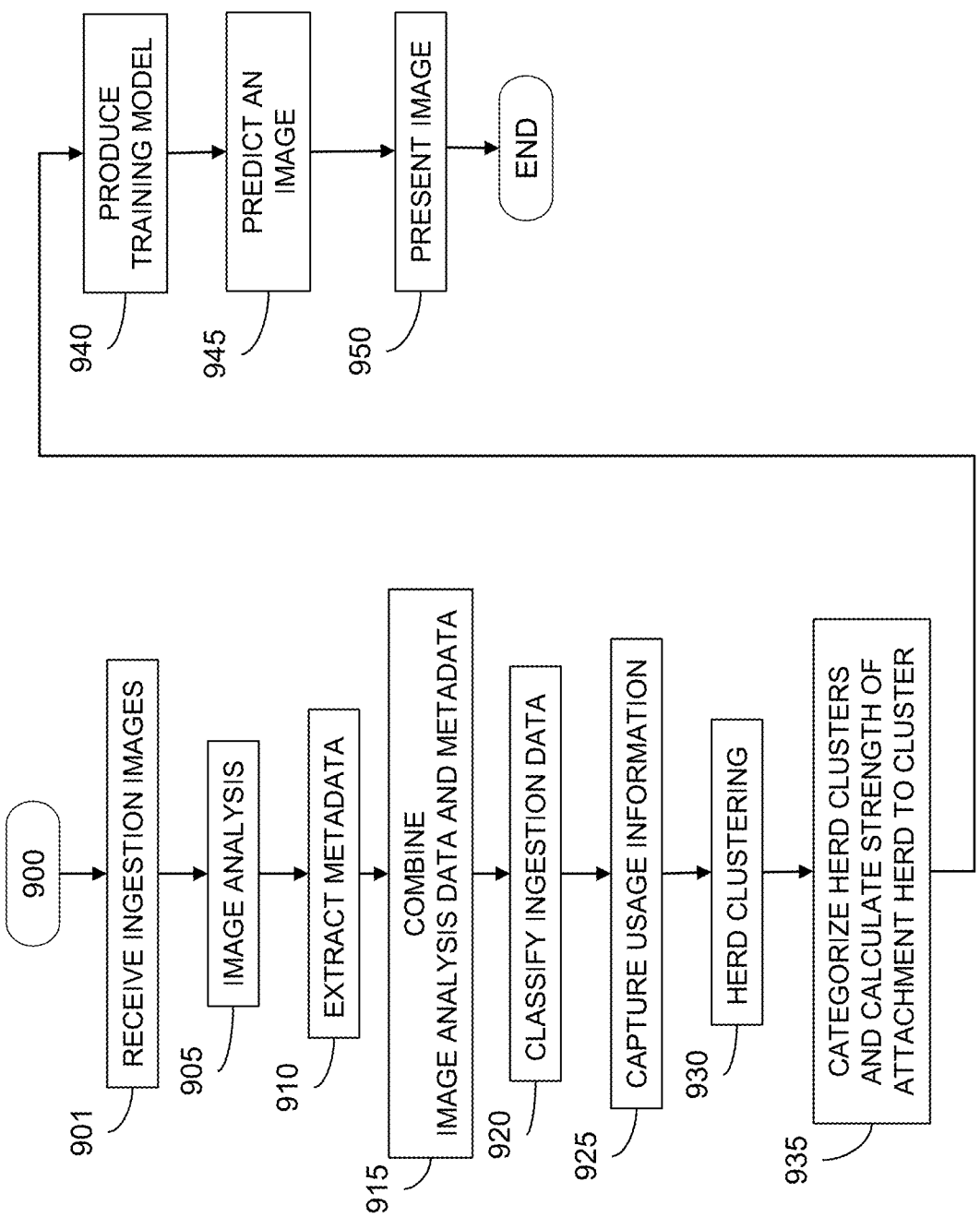
FIG. 8 illustrates a flow diagram for an exemplary method in which the technology disclosed herein may operate in various embodiments.

FIG. 8 illustrates a flow diagram for an exemplary method 900. At 901, the method 900 may receive, at a computer system, ingestion images corresponding to visual depictions of the features or products for the room or location. At 905, the method 900 may include analyzing the ingestion images, by the computer system, to determine at least one of color family, compositional tone, temperature, texture, luminosity, hue, or tint to produce image analysis data, by the computer system, to determine at least one of color family, compositional tone, temperature, texture, luminosity, hue, or tint to produce image analysis data. At 910, the method 900 may include extracting metadata of the ingestion images, the metadata including data identifying the features or products appearing in the ingestion images as belonging to classes according to a taxonomy model. At 915, the method 900 may include combining the image analysis data and the metadata to produce ingestion data. At 920, the method 900 may include classifying the ingestion data into the classes according to the taxonomy model to produce classified ingestion data.

At 925, the method 900 may include capturing usage information corresponding to users' usage of a web site or application and users' interaction with the ingestion images and correlating the usage information to respective images from the ingestion images. At 930, the method 900 may include herd clustering the class clusters based on the usage information to produce herd clusters on multiple axes for each of the users.

At 935, the method 900 may include categorizing the herd clusters to identify herds of users and calculate a strength of attachment of each herd to each herd cluster. At 940, the method 900 may include producing a training model for predictions of the personal preferences of a user by calculating a strength of attachment of the user to each of the herds and, at 945, predicting an image from the ingestion images to be pleasing to the user based on the training model.

At 950, the method 900 may include presenting, via the computer system, the image.

While FIG. 8 illustrates various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other example methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an example methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

Figure 9:
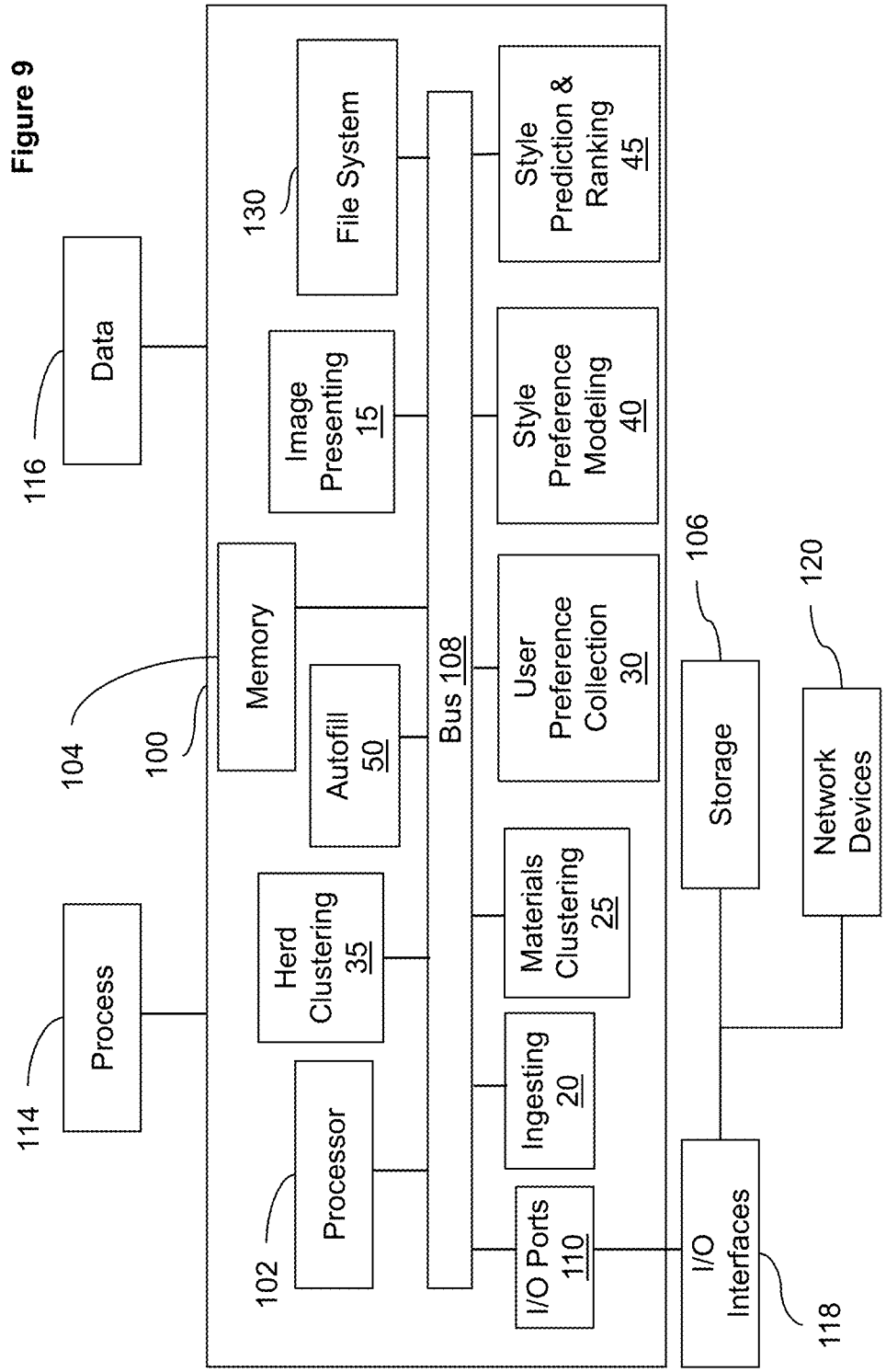
FIG. 9 illustrates a block diagram of an exemplary apparatus, machine, or computer system that may be used to implement features of embodiments of the disclosed systems or methods.

FIG. 9 illustrates a block diagram of an exemplary apparatus, machine, or computer system 100 that may be used to implement features of embodiments of the disclosed system 5 or method 900. The machine 100 includes a processor 102, a memory 104, and I/O Ports 110 operably connected by a bus 108.

In one example, the machine 100 may transmit input and output signals via, for example, I/O Ports 110 or I/O Interfaces 118. The machine 100 may also include the image presenter 15, the ingestion engine 20, the materials clustering engine 25, the user preference collection engine 30, the herd clustering engine 35, the style preference modeling engine 40, the style prediction and ranking engine 45, and the autocompletion engine 50 and all of their components. Thus, the image presenter 15, the ingestion engine 20, the materials clustering engine 25, the user preference collection engine 30, the herd clustering engine 35, the style preference modeling engine 40, the style prediction and ranking engine 45, and the autocompletion engine 50 may be implemented in machine 100 as hardware, firmware, software, or combinations thereof and, thus, the machine 100 and its components may provide means for performing functions described herein as performed by the image presenter 15, the ingestion engine 20, the materials clustering engine 25, the user preference collection engine 30, the herd clustering engine 35, the style preference modeling engine 40, the style prediction and ranking engine 45, and the autocompletion engine 50.

The processor 102 can be a variety of various processors including dual microprocessor and other multi-processor architectures. The memory 104 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A storage 106 (which may include the image storage 10) may be operably connected to the machine 100 via, for example, an I/O Interfaces (e.g., card, device) 118 and an I/O Ports 110. The storage 106 can include, but is not limited to, devices like a magnetic disk drive, a solid-state disk drive, a floppy disk drive, a tape drive, a Zip drive, a flash memory card, or a memory stick. Furthermore, the storage 106 can include optical drives like a CD-ROM, a CD recordable drive (CD-R drive), a CD rewriteable drive (CD-RW drive), or a digital video ROM drive (DVD ROM). The memory 104 can store processes 114 or data 116, for example. The storage 106 or memory 104 can store an operating system that controls and allocates resources of the machine 100.

The bus 108 can be a single internal bus interconnect architecture or other bus or mesh architectures. While a single bus is illustrated, it is to be appreciated that machine 100 may communicate with various devices, logics, and peripherals using other busses that are not illustrated (e.g., PCIE, SATA, Infiniband, 1394, USB, Ethernet). The bus 108 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The machine 100 may interact with input/output devices via I/O Interfaces 118 and I/O Ports 110. Input/output devices can include, but are not limited to, a keyboard, a microphone, a pointing and selection device, cameras, video cards, displays, storage 106, image storage 15, network devices 120, and the like. The I/O Ports 110 can include but are not limited to, serial ports, parallel ports, and USB ports.

The machine 100 can operate in a network environment and thus may be connected to network devices 120 via the I/O Interfaces 118, or the I/O Ports 110. Through the network devices 120, the machine 100 may interact with a network. Through the network, the machine 100 may be logically connected to remote devices. The networks with which the machine 100 may interact include, but are not limited to, a local area network (LAN), a wide area network (WAN), and other networks. The network devices 120 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 120 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

The invention claimed is:

1. A method of presenting images of features or products for a room or location, the method comprising:
   receiving, at a computer system, ingestion images corresponding to visual depictions of the features or products for the room or location;
   analyzing the ingestion images, by the computer system, to determine at least one of color family, compositional tone, temperature, texture, luminosity, hue, or tint to produce image analysis data;
   extracting metadata of the ingestion images, the metadata including data identifying the features or products appearing in the ingestion images as belonging to classes according to a taxonomy model;
   combining the image analysis data and the metadata to produce ingestion data;
   classifying the ingestion data into the classes according to the taxonomy model to produce classified ingestion data;
   materials clustering the classified ingestion data to produce materials clusters on multiple axes for each of the classes;
   capturing usage information corresponding to users' usage of a web site or application and users' interaction with the ingestion images, and correlating the usage information to respective images from the ingestion images;
   herd clustering the materials clusters based on the usage information to produce herd clusters on multiple axes for each of the users;
   categorizing the herd clusters to identify herds of users and calculate a strength of attachment of each herd to each herd cluster;
   producing a training model for predictions of the personal preferences of a user by calculating a strength of attachment of the user to each of the herds;
   predicting an image from the ingestion images to be pleasing to the user based on the training model;
   presenting, via the computer system, the image,
   wherein the analyzing the ingestion images includes:
      dividing a first image from the ingestion images into m-by-n blocks, each block covering a portion less than an overall area of the first image;
      analyzing each block to determine a predominant color, frequency of color variations, frequency of light to dark transitions, or depth of light to dark transitions to produce first image analysis data; and
      reassembling the blocks into a weighting matrix comprised of all the blocks organized by weighted nearest-neighbor.

2. The method of claim 1, the analyzing the ingestion images further comprising:
   center-weighting the weighting matrix to increase values of blocks at center of the first image relative to values of blocks at edges of the image.

3. The method of claim 1, further comprising:
   thinning the blocks to reduce noise generated by inter-block changes in features by applying a Gaussian blur to each block to produce thinned blocks;
   analyzing each thinned block to determine a predominant color, frequency of color variations, frequency of light to dark transitions, and depth of light to dark transitions to produce second image analysis data; and
   combining the first image analysis data and the second image analysis data.

4. The method of claim 1, wherein m=n and the portion is in the range of 0.05 to 0.1% of the first image depending on size of the first image.

5. The method of claim 1, comprising:
   to determine color family, calculating a weighted average predominant color of the blocks in the weighting matrix and indexing the weighted average predominant color against Pantone colors;
   to determine hue or tint, converting an RGB representation of the blocks in the weighting matrix to HSL, HSV, HSI, or HSB color space and selecting hue component;
   to determine luminosity, converting the RGB representation to the HSL color space and using luminosity component;
   to determine texture, calculating a weighted average of light to dark transitions of the blocks in the weighting matrix, wherein a lower number of transitions indicates a smoother texture than a higher number of transitions and the higher number of transitions indicates a coarser texture than the lower number of transitions;
   to determine temperature, indexing the weighted average predominant color to a linear spread of colors generated on a heat map scale ranging from hotter to colder arranged by RGB where red is hotter and blue is colder; or
   to determine compositional tone, combining the weighted average of the texture calculation and the weighted average of the temperature calculation.

6. The method of claim 1, wherein the taxonomy model includes the classes and subclasses within the classes.

7. The method of claim 1, wherein
   at least one of the materials clustering and the herd clustering is performed using k-means++ clustering, or
   the categorizing the herd clusters is performed using naive bayesian classification to identify the herds and calculate the strength of attachment of each herd to each herd cluster.

8. The method of claim 1, wherein the usage information corresponds to at least one of:
   user performed searches and search criteria;
   user examination of search results and depth of examination as determined by how many interactions and repeat interactions were performed by the user on an individual search result;
   user positive identification of a style and a type of the positive identification including at least one of a purchase of an item in the style, a like indication of the style or an item in the style, or addition of an item in the style to a wish list.

9. The method of claim 1, wherein the producing the training model comprises at least one of:
   initializing the training model using a K-NN (k nearest neighbor) training algorithm on the herd clusters weighted by the strength of attachment of the user to each of the herds;
   using K-NN outliers to indicate user preference that varies from the herd; or weighting data according to date such that older data is less significant than recent data.

10. A machine or group of machines forming a system including at least one processor and at least one memory, the system for presenting images of features or products for a room or location, the system comprising:
an ingestion engine configured to:
receive ingestion images corresponding to visual depictions of the features or products for the room or location;
analyze the ingestion images to determine at least one of color family, compositional tone, temperature, texture, luminosity, hue, or tint to produce image analysis data;
extract metadata of the ingestion images, the metadata including data identifying the features or products appearing in the ingestion images as belonging to classes according to a taxonomy model; and
combine the image analysis data and the metadata to produce ingestion data;
a materials clustering engine configured to:
classify the ingestion data into the classes according to the taxonomy model to produce classified ingestion data;
materials cluster the classified ingestion data to produce materials clusters on multiple axes for each of the classes;
a user preference collection engine configured to capture usage information corresponding to users' usage of a web site or application and users' interaction with the ingestion images, and correlating the usage information to respective images from the ingestion images;
a herd clustering engine configured to:
herd cluster the materials clusters based on the usage information to produce herd clusters on multiple axes for each of the users; and
categorize the herd clusters to identify herds of users and calculate a strength of attachment of each herd to each herd cluster;
a style preference modeling engine configured to produce a training model for predictions of the personal preferences of a user by calculating a strength of attachment of the user to each of the herds;
a style prediction engine configured to predict an image from the ingestion images to be pleasing to the user based on the training model;
an autocompletion engine configured to present the image,
wherein the ingestion engine is configured to analyze the ingestion images including by:
dividing a first image from the ingestion images into m-by-n blocks, each block covering a portion less than an overall area of the first image;
analyzing each block to determine a predominant color, frequency of color variations, frequency of light to dark transitions, or depth of light to dark transitions to produce first image analysis data; and
reassembling the blocks into a weighting matrix comprised of all the blocks organized by weighted nearest-neighbor.

11. The system of claim 10, wherein the ingestion engine is configured to analyze the ingestion images including by center-weighting the weighting matrix to increase values of blocks at center of the first image relative to values of blocks at edges of the image.

12. The system of claim 10, wherein the ingestion engine is configured to analyze the ingestion images including by:
thinning the blocks to reduce noise generated by inter-block changes in features by applying a Gaussian blur to each block to produce thinned blocks;
analyzing each thinned block to determine a predominant color, frequency of color variations, frequency of light to dark transitions, and depth of light to dark transitions to produce second image analysis data; and
combining the first image analysis data and the second image analysis data.

13. The system of claim 10, wherein m=n and the portion is in the range of 0.05 to 0.1% of the first image depending on size of the first image.

14. The system of claim 10, wherein the ingestion engine is configured to analyze the ingestion images including:
to determine color family, calculating a weighted average predominant color of the blocks in the weighting matrix and indexing the weighted average predominant color against Pantone colors;
to determine hue or tint, converting an RGB representation of the blocks in the weighting matrix to HSL, HSV, HSI, or HSB color space and selecting hue component;
to determine luminosity, converting the RGB representation to the HSL color space and using luminosity component;
to determine texture, calculating a weighted average of light to dark transitions of the blocks in the weighting matrix, wherein a lower number of transitions indicates a smoother texture than a higher number of transitions and the higher number of transitions indicates a coarser texture than the lower number of transitions;
to determine temperature, indexing the weighted average predominant color to a linear spread of colors generated on a heat map scale ranging from hotter to colder arranged by RGB where red is hotter and blue is colder; or
to determine compositional tone, combining the weighted average of the texture calculation and the weighted average of the temperature calculation.

15. The system of claim 10, wherein the taxonomy model includes the classes and subclasses within the classes.

16. The system of claim 10, wherein
at least one of the materials clustering and the herd clustering is performed using k-means++ clustering, or
the categorizing the herd clusters is performed using naive Bayesian classification to identify the herds and calculate the strength of attachment of each herd to each herd cluster.

17. The system of claim 10, wherein the usage information corresponds to at least one of:
user performed searches and search criteria;
user examination of search results and depth of examination as determined by how many interactions and repeat interactions were performed by the user on an individual search result;
user positive identification of a style and a type of the positive identification including at least one of a purchase of an item in the style, a like indication of the style or an item in the style, or addition of an item in the style to a wish list.

18. The system of claim 10, wherein the producing the training model comprises at least one of:
initializing the training model using a K-NN (k nearest neighbor) training algorithm on the herd clusters weighted by the strength of attachment of the user to each of the herds;
using K-NN outliers to indicate user preference that varies from the herd; or weighting data according to date such that older data is less significant than recent data.

\* \* \* \* \*